United States Patent [19]

Gonnet et al.

[11] Patent Number: 4,868,228

[45] Date of Patent: Sep. 19, 1989

[54] GRINDING AGENT BASED UPON NEUTRALIZED ACRYLIC POLYMERS AND/OR COPOLYMERS FOR AQUEOUS SUSPENSIONS OF COARSE MINERAL MATERIALS FOR PIGMENTS APPLICATIONS

[75] Inventors: Olivier Gonnet, St André de Corcy; Georges Ravet, Craponne; Jacky Rousset, Chatillon sur Chalaronne, all of France

[73] Assignee: Coatex, S.A., Caluire, France

[21] Appl. No.: 102,774

[22] Filed: Sep. 23, 1987

Related U.S. Application Data

[63] Continuation of Ser. No. 890,871, Jul. 25, 1986, abandoned, which is a continuation of Ser. No. 715,773, Mar. 25, 1985, abandoned, which is a continuation of Ser. No. 518,636, Jul. 29, 1983, abandoned.

[30] Foreign Application Priority Data

Aug. 6, 1982 [FR] France ............................ 82 14029

[51] Int. Cl.$^4$ ............................................ C08K 3/26
[52] U.S. Cl. .................................... 523/333; 524/425; 524/556; 525/330.2; 526/240
[58] Field of Search ............... 523/333; 524/425, 556; 526/240; 525/330.2

[56] References Cited

U.S. PATENT DOCUMENTS

| | | | |
|---|---|---|---|
| 2,956,046 | 10/1960 | Glavis et al. | 526/240 |
| 3,058,958 | 10/1962 | Glavis | 526/240 |
| 4,243,430 | 1/1981 | Sperry et al. | 106/308 M |
| 4,554,307 | 11/1985 | Farrer et al. | 524/556 |

FOREIGN PATENT DOCUMENTS 777306  9/1955  United Kingdom ............... 526/240

*Primary Examiner*—C. Warren Ivy
*Assistant Examiner*—Alex H. Walker
*Attorney, Agent, or Firm*—Oblon, Spivak, McClelland, Maier & Neustadt

[57] ABSTRACT

Grinding agent based upon neutralized polymers and/or copolymers for an aqueous suspension of coarse mineral materials for applications in pigments consisting of acid acrylic polymers and/or copolymers which are entirely neutralized by at least one neutralizing agent having a monovalent function and at least one neutralizing agent having a polyvalent function.

12 Claims, No Drawings

GRINDING AGENT BASED UPON NEUTRALIZED ACRYLIC POLYMERS AND/OR COPOLYMERS FOR AQUEOUS SUSPENSIONS OF COARSE MINERAL MATERIALS FOR PIGMENTS APPLICATIONS

This application is a continuation of application Ser. No. 890,871, filed July 25, 1986, now abandoned, which is a continuation of application Ser. No. 715,773, filed Mar. 25, 1985, now abandoned, which is a continuation of application Ser. No. 518,636, filed July 29, 1983, now abandoned.

The invention concerns an improved grinding agent in an aqueous suspension of coarse mineral materials, consisting of acrylic, acid polymers and/or copolymers completely neutralized by means of at least one neutralizing agent having a monovalent function and at least one neutralizing agent having a polyvalent function, a grinding agent capable of providing an aqueous suspension of fine mineral particles, intended in particular for applications in pigments, with dimensions less than 2 microns and of which at least 75% are smaller than one micron.

The invention also concerns a new application of said grinding agent an an improved process for preparing by grinding an aqueous suspension of mineral materials the viscosity of which remains constant with time, thus ensuring considerable ease of handling and application, said process being particularly suitable for grinding an aqueous suspension of calcium carbonate of which the content of dried matter is at least 70% by weight, of which at least 95% of the constituent particles after grinding are smaller than 2 microns, and 75% of them smaller than one micron.

The use of mineral substances such as calcium carbonate, sulphate and silicate, and titanium dioxide for preparing industrial products for the paint industry, for coating paper, fillers for rubbers and synthetic resins etc. has been known for a considerable time.

However since these mineral substances do not have a natural lamellar or laminated structure which would facilitate dispersion, as is the case for certain substances such as the aluminum silicates usually known as kaolin, the artisan must convert them by grinding into a very fine aqueous suspension in which the constituent particles are as small as possible, i.e. smaller than a few microns, if they are to be used as pigments.

A number of publications show the extent and complexity of grinding mineral substances in an aqueous medium in order to obtain the partially fine grade necessary for use as pigments. Thus in the particular case of paper coating, it is well known that the coating formed from mineral pigments such as the kaolins, calcium carbonate, calcium sulphate and titanium dioxide suspended in water, also contains binding agents and dispersants together with other additives such as thickeners and coloring agents. It is desirable for a coating of this kind to have a low viscosity which remains stable throughout the coating process in order to facilitate handling and application, as well as the highest possible content of mineral material in order to reduce the amount of heat necessary to dry out the aqueous fraction of the coating material. An ideal suspension of this kind, combining all these basic qualities, would resolve the specialist's well known problems of grinding, storage, transport from the production plant to the place of application and finally transfer by pump during use.

In this connection it has been found that the techniques of grinding inorganic substances in an aqueous medium led to suspensions that were unstable with time, as the mineral substances settled and the viscosity increased. For this reason the artisan in processes belonging to the oldest techniques of producing mineral materials by grinding, has become resigned to grinding the mineral substance in an aqueous suspension in one or more successive operatons, then drying and sorting this ground product by removing the particles that were too big, separating the mineral particles of the desired grain size in order to obtain a fine mineral powder with a low water content. This fine powder for applications as pigments is easily transportable from the production plant to the place of application where it is again placed in suspension in water for use as a pigment.

The inability to convserve mineral pigments in the form of an aqueous suspension between the operations of grinding and application has encouraged the artisan to continue research in this field, research while involves grinding mineral substances in an aqueous suspension, producing after grinding a pigment suspension with low viscosity that is stable with time. Thus for example French patent No. 1 506 724 proposes a process for preparing by grinding with an aqueous suspension of calcium carbonate, stable with time, which consists in forming under stirring an aqueous suspension containing 25-50% by weight of calcium carbonate and grinding this aqueous material using an appropriate grinding material, in the presence of a dispersant. This dispersant is a water-soluble acrylic polymer, which is added to the grinding medium at the rate of 0.2 to 0.4% by weight of the calcium carbonate present. Now, despite the undoubted advantage of having a pigmentary mineral suspension that is stable with time, it appears that such a suspension has disadvantages that the artisan may consider to be substantial. Such is the case for example for the dry matter content of such a suspension to be ground, which must necessarily be between 25% and 50% by weight and preferably equal to about 40% by weight. If this concentration is less than 25%, the process described is economically unattractive owing to its low yield, and if the initial dry matter content is above 50%, the efficiency of the grinding process falls owing to the sharp rise in the viscosity of the medium which becomes an obstacle to the grinding process itself and thus leading to a suspension with large grain size.

Thus when the dry matter concentration of the suspension to be ground is arranged to be between 25% and 50% by weight, the grain size of calcium carbonate obtained after a very long period of grinding, in the presence of the dispersant, can be considered as suitable for pigment applications, since 95% of the particles have a greatest dimension less than 2 microns.

This inability to grind an aqueous suspension of mineral substances with a concentration above 50% owing to the sharp increase in viscosity has encouraged researchers to find another approach. Processes have been proposed for forming an aqueous suspension of mineral substances with a high dry matter content, without grinding. For example French patent No. 1 562 326 describes a process for preparing an aqueous suspension of mineral substances. The objective of this process is to obtain an aqueous suspension which is highly concentrated in dry matter and sufficiently stable to be transported in this form from the production plant to the place of use. The proposed process consists in forming an aqueous suspension of mineral matter containing from 70 to 85% by weight of dry matter of which at least 99% by weight of the initial particles have one dimension less than or equal to 50 microns, then stirring the said suspension in the presence of a dispersing agent which may be a sodium or potassium salt, a polyphosphoric acid, a polyacrylic acid, a polysilicic acid, etc. obtained by their complete neutralization using sodium or potassium hydroxide. The dispersant is then introduced at a concentration of about 0.05% to 0.5% by weight of the dry matter in the said suspension. The author notes that the dry matter content of the suspension should not be greater than 85% by weight owing to the sharp increase in its viscosity and could not be less than 70% by weight without leading to harmful sedimentation.

Thus existing expertise proposes solutions which are not fully satisfactory.

One of these solutions concerns grinding, in the presence of a dispersant, an aqueous suspension of calcium carbonate containing too little dry matter to be interesting, although it does have the advantage of producing a pigmentary suspension of low viscosity and small grain size, giving up to 95% of particles smaller than 2 microns.

The other of these solutions concerns the preparation of an aqueous suspension with a high dry matter content, containing 70% to 85% by weight of mineral materials of which 99% of the initial particles have one dimension less than or equal to 50 microns, by introducing into the medium a dispersant to stabilize these particles. However this process, although providing a suspension of low viscosity, is not usable because the grain size of the constituent mineral particles is too irregular and coarse for applications in the pigments.

Since the processes recommended in the literature did not meet the requirements of the users for a pigmentary aqueous suspension which is simultaneously concentrated in dry matter, with small grain size and with low, stable viscosity, the applicant on the basis of considerable research has already proposed, in French patent 2 488 814 a new grinding agent for mineral substances in an aqueous medium, capable of providing a pigmentary suspension having the desired qualities. This grinding agent, made up of acrylic, alkaline polymers and/or copolymers, consists only of the fraction of these acrylic alkaline polymers and/or copolymers of which the specific viscosity lies between 0.3 and 0.8.

In the prior art, the use of acrylic alkaline polymers and/or copolymers was well known as a dispersant for mineral substances in an aqueous suspension, but not as a grinding agent. For this purpose the acrylic alkaline polymers and/or copolymers are prepared according to known processes, by radical polymerization of the acrylic acid in the presence of polymerization regulators such as for example organic compounds based upon hydroxylamine and in the presence of polymerization initiators such as the peroxides and the persels, for example hydrogen peroxide, the persulphates, etc. and carrying out a complete neutralisation of the polymerizate using sodium or potassium hydroxide. This polymerizate is then introduced in sufficient quantity to the aqueous suspension of mineral materials which is stirred in order to facilitate dispersion.

The applicant, in his research, wishing to bring about improved grinding of mineral materials in aqueous suspension, attempted to use such a polymerizate as a "grinding agent" by introducing it into the suspension of mineral substances containing at least 50% by weight of dry matter, a value which had earlier been regarded as a maximum not to be exceeded; the applicant then observed that the suspension prepared in this way and subjected to grinding became highly viscous, such that it became unable in these conditions to grind or even to satisfactorily disperse the mineral materials.

On the basis of this observation, the applicant carried out further investigations into the fundamental reasons for the increase in viscosity, during the grinding operation, of the aqueous suspension of mineral materials with a high concentration of dry matter and observed that the increase in the viscosity of the suspension was conditioned by the average specific viscosity of the acrylic alkaline polymers and/or copolymers used as grinding agents having a mean specific viscosity less than 0.8. Subsequently, by carrying out a number of grinding operations on aqueous suspensions containing high concentrations of mineral materials, the applicant established that the only fraction of the acrylic alkaline polymers and/or copolymers possessing the maximum basic qualities of a grinding agent is that of which the specific viscosity lies between 0.3 and 0.8. Such a grinding agent described in French patent 2 488 814 represents substantial progress over earlier knowledge, since this fraction of acrylic alkaline polymers and/or copolymers permits the conversion by grinding in an aqueous suspension with a high concentration of dry matter of coarse inorganic substances into very fine particles of which 95% have a dimension less than 2 microns and of which 75% at least have a dimension less than 1 micron, but also permits the realization of a suspension of fine mineral substances of which the viscosity is much lower than that obtained by using additives recommended in the prior art.

However, despite the substantial improvement provided by this grinding agent, even from the standpoint of reducing the viscosity of suspensions of very fine particles after grinding in a ratio of at least 2 to 1, it was observed tha the viscosity of suspensions of very fine mineral particles, following grinding in the presence of this agent, was absolutely not stable with time, for example the said viscosity after eight days possibly being two to five times higher than that measured on the same suspensions immediately after grinding.

Since the recommended processes did not meet the requirements of the users for an aqueous pigmentary suspension having at the same time a high concentration of dry matter, low grain size and low, stable viscosity, the applicant, continuing his research, discovered and developed a grinding agent for mineral substances, in an aqueous medium, whereby a pigmentary suspension having the desired qualities could be obtained, without the abovementioned drawbacks.

According to the invention, the grinding agent in an aqueous suspension of coarse inorganic materials, intended for applications to pigments, made up of acrylic acid polymers and/or copolymers, obtained according to the known processes of polymerization, is characterised by the fact that it is formed by the said acid polymers and/or copolymers that are completely neutralized by means of at least one neutralizing agent having a monovalent function and at least one neutralizing agent having a polyvalent function.

To assist understanding the objective of the invention, it is recalled that a "neutralizing agent having a monovalent function", for example, has the capability of bonding with an available branch of the acrylic acid polymers and/or copolymers.

As the applicant continued his research in the field of grinding agents in an aqueous medium for coarse mineral materials and, also, to carry out further industrial test, he observed and verified that it was possible to make pigmentary aqueous suspensions, at the same time more concentrated in dry matter than those obtained using earlier processes, of low grain size, low viscosity immediately after grinding, but particularly very stable with time, this stability being a considerable improvement over the results obtained in earlier practice, due to the fact that the grinding agent consists of acrylic acid polymers and/or copolymers, of which the active sites are completely neutralized by at least one neutralizing agent having a monovalent function and by at least one neutralizing agent having a polyvalent function.

As has been described, the grinding agent according to the invention consists of completely neutralized acrylic acid polymers and/or copolymers. These acrylic polymers and/or copolymers are produced by polymerization using known processes in an aqueous, alcoholic, hydroalcoholic, aromatic or aliphatic medium from at least one of the following monomers and/or comonomers: acrylic and/or methacrylic acid, itaconic acid, crotonic acid, fumaric acid, maleic acid, isocrotonic acid, aconitic acid, mesaconic acid, sinapic acid, undecylenic acid, angelic acid, hydroxyacrylic acid, and also acrolein, acrylamide, acrylonitrile, esters of acrylic and methacrylic acids and in particular dimethylaminoethyl methacrylate, the imidazoles, vinylpyrolidone, vinylcaprolactame, ethylene, propylene, isobutylene, di-isobutylene, vinyl acetate, styrene, alphamethylstyrene, and methylvinylketone.

The polymerization medium may be water, methanol, ethanol, propanol, isopropanol, the butanols or dimethylformamide, dimethylsulfoxide, tetrahydrofurane, acetone, methylethylketone, ethyl acetate, butyl acetate, hexane, heptane, benzene, toluene, xylene, mercaptoethanol, tert. dodecylmercaptan, thioglycolic acid and its esters, dodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, methyl chloride, and the ethers of monopropyleneglycol and diethyleneglycol.

The acrylic polymers and/or copolymers to be used as a grinding agent according to the invention generally have a specific viscosity of 25 at the most and preferably 10 at the most. As has already been said, these polymers are produced by polymerization according to known processes in the presence of initiators and regulators.

The specific viscosity of the acrylic polymers and/or copolymers which is symbolised by the letter "$\eta$" is determined as follows:

A solution of acrylic polymer and/or copolymer neutralized to 100% (neutralization rate: 1) by sodium hydroxide is prepared by dissolving 50 g of dry polymer and/or copolymer in 1 liter of a solution of distilled water containing 60 g of NaCl. Using a capillary viscometer with a Baume constant equal to 0.000105 in a bath thermostatically held at 25° C., the flow time is measured of a given volume of the above-mentioned solution containing the alkaline acrylic polymer and/or copolymer and also the flow time of the same volume of aqueous solution of sodium chloride not containing the said polymer and/or copolymer. It is then possible to define the viscosity "$\eta$" using the following relationship:

$$\eta = \frac{\text{(Flow time of polymer solution)} - \text{(Flow time of NaCl solution)}}{\text{Flow time of the NaCl solution}}$$

The capillary tube is usually selected such that the flow time of the NaCl solution not containing polymer and/or copolymer is about 90–100 seconds, thus giving measurements of specific viscosity of very high precision.

The neutralizing agent having a monovalent function is selected from the group consisting of alkaline cations, in particular sodium and potassium, or the primary, secondary or tertiary aliphatic and/or cyclic amines such as for example the ethanol amines (mono, di, triethanolamine), the mono and diethylamines, the cyclohexylamine, and methylcyclohexylamine.

The neutralizing agent having a polyvalent function is in turn selected from the group consisting of the divalent alkaline earth cations, in particular magnesium and calcium, or zinc, or those consisting of trivalent cations, including in particular aluminum, or again, by certain cations of higher valency such as the primary and secondary aliphatic and/or cyclic amines such as for example the mono and diethylamines, or the cyclo and methylcyclohexylamines.

The acid sites of the acrylic polymers and/or copolymers may be neutralized using possible combinations of at least one neutralizing agent having a monovalent function and at least one neutralizing agent having a polyvalent function.

Among the pairs of neutralizing agents, it is common to use pairs consisting of an agent with a monovalent function and an agent with a divalent or a trivalent function, such as for example the pairs ($Na^+$ or $K^+$), ($Na^+$ or $K^+$ and $Mg^{++}$), ($Na^+$ or $K^+$ and $Zn^{++}$), ($Na^+$ or $K^+$ and $Al^{+++}$), ($Na^+$ or $K^+$ and amine).

Among the triple group of neutralizing agents, it is interesting to use various combinations such as two neutralizing agents with a monovalent function with one neutralizing agent having a polyvalent function or again a neutralizing agent having a monovalent function, with two neutralizing agents having a polyvalent function, such as for example the triple groups ($Na^+$, $K^+$, and $Ca^{++}$), or again ($Na^+$, $Ca^{++}$, $Mg^{++}$) ($Na^+$, $Ca^{++}$, $Al^{+++}$).

These combinations of neutralizing agents are not limited to the few cases used to illustrate the potential of the invention.

Each neutralizing agent of the active sites of the polymerizate in solution, leading to the grinding agent according to the invention, acts according to the neutralisation rates natural to each valency function.

the neutralization rate in the case of at least one neutralizing agent having a monovalent function lies between 0.40 and 0.95 and preferably between 0.60 and 0.90.

The neutralization rate in the case of at least one neutralizing agent having a polyvalent function lies between 0.60 and 0.05 and preferably between 0.40 and 0.10.

It is clear, and the applicant has verified it, that the complete neutralization rate of the acid sites can be obtained, by equivalence, by mixing suitable fractions of completely neutralized acid polymers and/or copolymers, certain of these fractions being neutralized by at least one neutrlizing agent having a monovalent function while the other fractions are neutralized by at least one neutralizing agent having a polyvalent function.

According to one variant, the acrylic polymers and/or copolymers that are to be used as grinding agents according to the invention may consist of the single fraction of these completely neutralized polymers and/or copolymers of which the specific viscosity lies between 0.3 and 0.8.

In this case, the fraction of acrylic polymer and/or copolymer with specific viscosity lying between 0.3 and 0.8 to be used as a grinding agent is generally isolated and extracted from the solution which results from the polymerization of at least one of the abovementioned monomers using known processes. Upon completion of the polymerization carried out in the presence of initiators and regulators well known to the artisan, the solution of the polymerizate obtained is completely neutralized by at least one meutralizing agent having a monovalent radical and by at least one neutralizing agent having a polyvalent radical.

The solution of the polymerizate thus neutralized is then processed using methods known to the specialist, by a polar solvent belonging to the group of methanol, ethanol, propanol, isopropanol, acetone, tetrahydrofurane. A separation into two phases then takes place. The less dense phase, comprising the major fraction of the polar solvent and the undesirable fraction of acrylic polymer and/or copolymer is eliminated while the denser aqueous phase is collected and constitutes the fraction of the completely neutralized acrylic polymers and/or copolymers of which the specific viscosity lies between 0.3 and 0.8.

It is also possible and, in certain cases, desirable, to refine further the selection of the fraction of completely neutralized acrylic polymers and/or copolymers by treating once more the denser aqueous phase already collected using a new batch of polar solvent which may be different from that initially used or which may be a mixture of polar solvents. Two phases again appear of which the denser, the aqueous phase, is collected and constitutes a fraction of the completely neutralized acrylic polymers and/or copolymers of which the specific viscosity lies within a narrower band. In practice, it has proved desirable to select the fraction of the completely neutralized acrylic polymers and/or copolymers of which the specific viscosity lies between 0.5 and 0.7.

In practice, the liquid phase resulting from the polymerization and containing the completely neutralized acrylic polymers and/or copolymers may be used in this form as a grinding agent for mineral substances to be ground, but it can also be treated by all known means, in order to eliminate this phase and isolate the completely neutralized acrylic polymers and/or copolymers in the form of a fine powder which can be used in this other form as a grinding agent.

In the case of the variant, the temperature at which the selection of the fraction of completely neutralized acrylic polymer and/or copolymer is carried out is not critical in itself, since it influences only the partition coefficient. In practice, the selection is carried out at ambient temperature, but there is no reason why it could not be carried out at higher temperatures.

The operation of grinding the mineral substance to be refined involves grinding the mineral substance with a grinding material of very fine particles in an aqueous medium containing the grinding agent.

In practice, an aqueous suspension of mineral substance to be ground is formed, with grain size initially 50 microns at the most, the quantity being such that the concentration of dry matter of the said suspension is at least 70% by weight.

To the suspension of mineral substance to be ground is added the grinding material with grain size advantageously lying between 0.20 mm and 4 mm. The grinder is generally in the form of particles of materials as various as silicon oxide, aluminum oxide, zirconium oxide or mixtures of these or synthetic resins of great hardness, steels, etc.

An example of the composition of such grinding materials is given by French Pat. No. 2 203 681 which describes the grinding substances formed from 30–70% by weight of zirconium oxide, 0.1–5% of aluminum oxide and 5–20% of silicon oxide. The grinding material is preferably added to the suspension in a quantity such that the weight ratio between this grinding material and the inorganic substance to be ground is at least 2 to 1, this ratio being preferably between the limits 3 to 1 and 5 to 1.

The mixture of the suspension and the grinding material is then mechanically stirred as in a conventional grinder, with micro-elements.

The grinding agent consisting of the completely neutralized acrylic polymer and/or copolymer according to the invention is also introduced into the mixture formed by the aqueous suspension of mineral substances and the grinding material at a rate of 0.2 to 2% by weight of the dried fraction of the said polymers with respect to the mass of mineral substance to be refined.

The time necessary to reach satisfactory fineness of the mineral substance after grinding varies according to the nature and amount of mineral substances to be ground and according to the method of stirring used and the temperature of the medium during the grinding operation.

The mineral substances to be fined according to the process of the invention may be of very different origins such as calcium carbonate and dolomites, calcium sulphate, kaolin titanium dioxide, i.e. all inorganic substances which have to be ground for use in applications as varied as paper coating, pigmentation of paints and texture coatings, filler for rubbers or synthetic resins, matting synthetic textiles and so on.

Thus applying the grinding agent according to the invention enables coarse mineral substances to be converted by grinding in an aqueous suspension with a high concentration of dry matter into very fine particles of which 95% have one dimension always below two microns and 75% at least have one dimension less than 1 micron, thus producing a suspension of very fine mineral particles of which the viscosity is low and stable with time.

The scope and value of the invention will be clarified by the following examples:

EXAMPLE 1

This example, the objective of which is to illustrate prior art concerns the grinding of calcium carbonate in the presence of a grinding agent which is a polyacrylate of sodium obtained by polymerizing acrylic acid in the presence of initiators and regulators according to two processes known to the artisan.

A first test concerns the grinding of calcium carbonate in the presence of sodium polyacrylate obtained by radical polymerization of acrylic acid in water, followed by complete neutralization by a single neutralizing agent having a monovalent function.

A second test concerns the grinding of calcium carbonate in the presence of sodium polyacrylate obtained by radical polymerization of acrylic acids in an aqueous medium, in the presence of isopropanol, followed by a distillation of the alcohol and a complete nuetralization of the polymerizate using sodium hydroxide, the only neutralizing agent used, having a monovalent neutralizing function.

The two tests were carried out using the same experimental criteria, the grinding carried out in the same equipment, in order that the results obtained may be compared.

For each test, an aqueous suspension of calcium carbonate obtained from the Orgon (France) deposit and a grain size less than 43 microns were prepared.

The aqueous suspension had a concentration of dry matter of 76% by weight with respect to the total mass.

The grinding agent was introduced into this suspension in the quantities shown in the table below, expressed as a percentage of dry weight with respect to the mass of calcium carbonate to be ground.

The suspension was placed in a grinder of the Dyno-Mill type with a fixed cylinder and rotary stirrer, the grinder consisting of Corindon balls of diameter between 0.5 mm and 1.6 mm.

The total volume taken up by the grinder was 1150 cm³ for a mass of 3040 g.

The grinding chamber had a volume of 1400 cm³.

The circumferential speed of the grinder was 10 m per second.

The suspension of calcium carbonate was recycled at a rate of 18 l per hour.

The outlet of the Dyno-Mill grinder was fitted with a separator with a 200 micron mesh in order to separate the suspension from the grinding agent.

The temperature in each grinding test was held at 65° C.

The grinding time in the experimental conditions described was between 60 and 100 minutes and was the time needed to obtain a ground mineral substance in which at least 75% of the particles had one dimension less than 1 micron.

Upon completion of grinding, the viscosity of the pigmentary suspension was measured using a Brookfield viscometer, at a temperature of 20° C. and a rotation speed of 100 rpm using spindle no 3.

After standing for 24 hours and 8 days, the viscosity of the suspension was measured again after being briefly stirred.

All the experimental results are shown in Table 1.

TABLE 1

|  | TEST 1 | TEST 2 |
| --- | --- | --- |
| Mineral substance to be ground | CaCO₃ (urgonite) | CaCO₃ (urgonite) |
| Concentration of dry matter in the suspension to be ground | 76% | 76% |
| Grinding agents Neutralization | Sodium polyacrylate .1 (100%) | Sodium polyacrylate 1 (100%) |
| Polymerization medium | Water | Water and isopropanol |
| Specific viscosity of the grinding agent | 0.58 | 0.54 |
| Consumption of grinding agent in percent of dry weight | 1.33 | 1.04 |
| pH of grinding medium | 9.2 | 9.2 |
| Percent mineral substances at 1 micron upon completion of grinding | 78 | 75 |
| Grinding temperature maintained at: | 65° C. | 65° C. |
| Viscosity in cps at 20° C. | | |
| after grinding | 850 | 500 |
| after standing for 24 hrs, stirred before measurement | 1280 | 800 |
| after standing for 8 days, stirred before measurement | 3600 | 1520 |

The table shows that the viscosity of the suspension after grinding is high and is unstable with time whatever its initial value, since it rises substantially after the suspension has been allowed to stand.

The table also shows that the polymerization medium has no significant effect on the viscosity of the suspension after grinding or on its variation with time.

EXAMPLE 2

This example, chosen to illustrate the object of the invention, is intended to show the mutual influence of each neutralizing agenyt for the active sites of the polymerizate in solution producing the grinding agent according to the invention, and also illustrates the influence of the neutralization rates attached to each valency function of the neutralizing agents.

In test no. 3, the calcium carbonate was ground in the presence of polyacrylic acid obtained in as in test 2 of example 1, by radical polymerization of acrylic acid in an aqueous medium in the presence of isopropanol followed by complete neutralization of the polymerizate by NaOH at 0.90 (90%) and by CaO at B 0.1 (10%).

In test no. 4, the calcium carbonate was ground in the presence of polyacrylate acid polymerized as in test 2 of example 1, the polymerizate being completely neutralized by NaOH at 0.8 (80%) and by CaO at 0.2 (20).

In test no. 5, the calcium carbonate was ground in the presence of polyacrylic acid, polymerized as in test 2 of example 1, the polymerizate being completely neutralized by NaOH at 0.7 (70%) and by CaO at 0.3 (30%).

For each of the tests 3, 4 and 5,an aqueous suspension of calcium carbonate obtained from the Orgon (France) deposit with a grain size less than 43 microns was prepared.

The aqueous suspension had a concentration of dry matter of 76% by weight with respect to the total mass.

The grinding agent was introduced into this suspension in the quantities shown in Table 2 below, expressed as a percentage by weight in terms of the mass of calcium carbonate to be ground.

The suspension to be ground was placed in the same grinder as in example 1, with the same amount of grinding agent and was treated using the same experimental criteria in order that the results obtained might be compared with those of example 1.

All the experimental results are given in Table 2 below.

TABLE 2

|  | TEST 3 | TEST 4 | TEST 5 |
| --- | --- | --- | --- |
| Mineral substance to be ground | CaCO₃ (urgonite) | CaCO₃ (urgonite) | CaCO₃ (urgonite) |
| Concentration of dry matter in the suspension being ground | 76% | 76% | 76% |
| Grinding agent | Polyacrylic acid | Polyacrylic acid | Polyacrylic acid |
| Polymerization medium | Water and isopropanol | Water and isopropanol | Water and isopropanol |

TABLE 2-continued

|  | TEST 3 | TEST 4 | TEST 5 |
|---|---|---|---|
| Neutralization rate for agent with: | | | |
| a monovalent function | $Na^+$: 0.9 | $Na^+$: 0.8 | $Na^+$: 0.7 |
| a polyvalent function | $Ca^{++}$: 0.1 | $Ca^{++}$: 0.2 | $Ca^{++}$: 0.3 |
| Specific viscosity of the grinding agent | 0.54 | 0.54 | 0.54 |
| Consumption of grinding agent in percent dry weight | 1.09 | 1.02 | 1.12 |
| pH of grinding medium | 9.2 | 9.2 | 9.2 |
| Percentage Mineral substances at 1 micron after grinding | 79 | 79 | 79 |
| Grinding temperature kept at: | 65° C. | 65° C. | 65° C. |
| Viscosity in cps at 20° C. | | | |
| on completion of grinding | 610 | 360 | 300 |
| after standing for 24 hours stirred before measurement | 780 | 350 | 310 |
| after standing for 8 days stirred before measurement | 1160 | 720 | 250 |

This second table, by comparison with Table 1 and more particularly with test 2 of example 1, shows:

The substantial fall in the viscosity of the calcium carbonate suspension immediately after grinding and also after standing for 24 hours or 8 days.

The beneficial effect of the neutralization rates for each valency function of the neutralizing agents, test 5 even shows a fall in viscosity with time, since a calculation of the ratio of viscosity after standing for 8 days to the viscosity immediately after grinding showed a considerable fall in this ratio once the process according to the invention is applied:

Test 1 - Prior Art: ratio 4
Test 2 - Prior Art: ratio 3
Test 3 - invention: ratio 1.9
Test 4 - invention: ratio 2.0
Test 5 - invention: ratio 0.83

EXAMPLE 3

This example which is intended to illustrate the object of the invention concerns the grinding of the same calcium carbonate used in example 1, in the presence of a grinding agent which is a completely neutralized polyacrylic acid, obtained by polymerising acrylic acid using the same process as for test 2 of example 1.

In test no. 6, illustrating earlier practice, the calcium carbonate was ground in the presence of polyacrylic acid obtained as in test 2 by radical polymerization of acrylic acid in an aqueous medium, in the presence of isopropanol and complete neutralization by potassium hydroxide.

In test no. 7, which illustrates the invention, the calcium carbonate was ground in the presence of polyacrylic acid obtained using the process of test no. 2 of example 1, by radical polymerization of acrylic acid in an aqueous medium in the presence of isopropanol and complete neutralization of thge polymerizate by two neutralizing agents, potassium hydroxide at 0.7 (70% of active sites) and calcium hydroxide at 0.3 (30% of active sites).

For each of the tests 6 and 7, an aqueous suspension of calcium carbonate obtained from the Orgon (France) deposit with a grain size less than 43 microns was prepared.

The aqueous suspension having a concentration of dry matter of 76% by weight with respect to the total mass.

The grinding agent was introduced into this suspension in the quantities shown in Table 3 below, expressed as a percentage by weight in terms of the mass of calcium carbonate to be ground.

The suspension to be ground was placed in the same grinder as for example 1, with the same quantity of grinding agent and was treated using the same experimental criteria, in order that the results obtained may be compared with those of example 1.

All the experimental results are given in Table 3 below.

TABLE 3

|  | TEST 6 | TEST 7 |
|---|---|---|
| Mineral substance to be ground | $CaCO_3$ (urgonite) | $CaCO_3$ (urgonite) |
| Concentration of dry matter in the suspension being ground | 76% | 76% |
| Grinding agent | Polyacrylic acid | Polyacrylic acid |
| Polymerization medium | Water and isopropanol | Water and isopropanol |
| Neutralization rate for agent with: | | |
| a monovalent function | $K^+$: 1.0 | $K^+$: 0.7 |
| a polyvalent function | — | $Ca^{++}$: 0.3 |
| Specific viscosity of the grinding agent | 0.54 | 0.54 |
| Consumption of grinding agent in percent dry weight | 1.15 | 1.10 |
| pH of grinding medium | 9.2 | 9.2 |
| Percentage mineral substances at 1 micron after grinding | 79 | 79 |
| Grinding temperature kept at: | 65° C. | 65° C. |
| Viscosity in cps at 20° C. | | |
| on completion of grinding | 610 | 410 |
| after standing for 24 hrs, stirred before measurement | 1260 | 420 |
| after standing for 8 days, Stirred before measurement | 2100 | 550 |

The third table shows by comparing tests 6 and 7, tests 2 (from Table 1) and 6 and then tests 2 (Table 1) and 7 that using, for the complete neutralization of the polymerizate, a single neutralizing agent (test 6: KOH) other than the one used in earlier practice (test 2: NaOH) did not produce acceptable results.

However, comparison between test 7 on the one hand with tests 2 and 6 on the other hand is significant for the substantial fall in the viscosity of the suspension of calcium carbonate after a grinding operation according to the invention, i.e. carried out in the presence of a grinding agent consisting of a completely neutralized polyacrylic acid, using a neutralizing agent having a monovalent radical (NaOH) and a neutralizing agent having a polyvalent radical ($Ca(OH)_2$).

EXAMPLE 4

This example which is intended to illustrate the object of the invention concerns the grinding of the same calcium carbonate used in example 1, in the presence of a grinding agent which is a polymethacrylic acid obtained by polymerizing methacrylic acid according to the process used for test 2 of example 1 and complete neutralization of the polymerizate.

In a test no. 8 illustrating prior art, the calcium carbonate was ground in the presence of sodium polymethacrylate obtained as in test no. 2 of example 1 by radical polymerization of methacrylic acid in an aqueous medium, in the presence of isopropanol, and complete nuetralization of the polymerizate by sodium hydroxide.

In a test no. 9 which illustrates the invention, the calcium carbonate was ground in the presence of polymethacrylic acid obtained according to the process of test no. 2 of example 1, by radical polymerisation of methacrylic acid in an aqueous medium in the presence of isopropanol and complete neutralization of the polymerizate by two neutralizing agents, one being sodium hydroxide (rate of 0.7) and the other calcium hydroxide (rate of 0.3).

For each of the tests 8 and 9 an aqueous suspension of calcium carbonate obtained from the Orgon (France) deposit with a grain size of less than 43 microns was prepared.

The aqueous suspension having a concentration of dry matter of 76% by weight with respect to the total mass.

The grinding agent was introduced into this suspension in the quantities shown in Table 4 below, expressed as a percentage by weight in terms of the mass of calcium carbonate to be ground.

The suspension to be ground was placed in the same grinder as in example 1, with the same quantity of grinding agent and was treated according to the same experimental criteria in order that the results obtained may be compared with those of example 1.

All the experimental results are given in Table 4 below.

TABLE 4

| | TEST 8 | TEST 9 |
|---|---|---|
| Mineral substance to be ground | $CaCO_3$ (urgonite) | $CaCO_3$ (urgonite) |
| Concentration of dry matter in the suspension being ground | 76% | 76% |
| Grinding agent | Polyacrylic acid | Polyacrylic acid |
| Polymerization medium | Water and isopropanol | Water and isopropanol |
| Neutralization rate for agent with: | | |
| a monovalent function | $Na^+$: 1.0 | $Na^+$: 0.7 |
| a polyvalent function | | $Ca^{++}$: 0.3 |
| Specific viscosity of the grinding agent | 0.63 | 0.63 |
| Consumption of grinding agent in percent dry weight | 1.28 | 1.30 |
| pH of grinding medium | 9.2 | 9.2 |
| Percentage mineral substances at 1 micron after grinding | 79 | 79 |
| Grinding temperature kept at: | 65° C. | 65° C. |
| Viscosity in cps at 20° C. | | |
| on completion of grinding | 650 | 410 |
| after standing for 24 hrs | 1050 | 410 |
| after standing for 8 days, stirred before measurement | 1900 | 430 |

The fourth table thus shows the substantial improvement in the viscosity of the calcium carbonate suspension with the grinding agent used is a polymethacrylic acid completely neutralized by means of one neutralizing agent having a monovalent function (NaOH) and one neutralizing agent having a polyvalent function ($Ca(OH)_2$).

Using the grinding agent according to the invention, the suspensions of calcium carbonate with a high concentration of dry matter acquire after grinding a very low stable viscosity.

EXAMPLE 5

This example which is intended to illustrate the object of the invention concerns the grinding of the same calcium carbonate used in example 1, in the presence of a grinding agent which is the acid of an acrylic copolymer obtained by copolymerization of the acrylic acid (70%) and butyl acrylate (30%) according to the process used for test 2 of example 1 and neutralization of the polymerizate.

In a test no. 10, which illustrates the former practice, the calcium carbonate was ground in the presence of the copolymer of acrylic acid-butyl acrylate obtained by radical copolymerization in an isopropanol medium with complete neutralization of the polymerizate by potassium hydroxide.

In a test no. 11 which illustrates the invention, the calcium carbonate was ground in the presence of the copolymer of acrylic acid and butyl acrylate obtained by radical polymerization in an isopropanol medium with complete neutralization of the polymerizate first by potassium hydroxide at 0.70 and secondly by calcium hydroxide at 0.30.

For each of the tests 10 and 11, an aqueous suspension of calcium carbonate from the Orgon (France) deposit with a grain size of less than 43 microns was prepared.

The aqueous suspension had a concentration of dry matter of 76% by weight with respect to the total mass.

The grinding agent was introduced into this suspension in the quantities shown in Table 5 below, expressed as a percentage by weight with respect to the mass of calcium carbonate to be ground.

The suspension to be ground was placed in the same grinder as in example 1, with the same amount of grinding agent and was treated according to the same experimental criteria, so that the results obtained may be compared with those of example 1.

All the experimental results are shown in Table 5 below.

TABLE 5

| | TEST 10 | TEST 11 |
|---|---|---|
| Mineral substance to be ground | $CaCO_3$ (urgonite) | $CaCO_3$ (urgonite) |
| Concentration of dry matter in the suspension being ground | 76% | 76% |
| Grinding agent | Copolymer of acrylic acid and of butyl acrylate 70/30 | |
| Polymerization medium | isopropanol | isopropanol |
| Neutralization rate for agent with: | | |
| a monovalent function | $K^+$: 1.0 | $K^+$: 0.7 |
| a polyvalent function | | $Ca^{++}$: 0.3 |
| Specific viscosity of the grinding agent | 0.70 | 0.70 |
| Consumption of grinding agent in percent dry weight | 0.98 | 0.99 |
| pH of grinding medium | 9.2 | 9.2 |
| Percentage mineral substances at 1 micron after grinding | 60 | 60 |
| Grinding temperature kept | 65° C. | 65° C. |

TABLE 5-continued

|  | TEST 10 | TEST 11 |
|---|---|---|
| at: | | |
| Viscosity in cps at 20° C. | | |
| on completion of grinding | 300 | 200 |
| after standing for 24 hrs, stirred before measurement | 340 | 180 |
| after standing for 8 days stirred before measurement | 600 | 210 |

Although this grinding agent does not give the same fineness of grinding (60% compared with 79% for the other tests) of the inorganic substances at 1 micron on completion of grinding, Table 5 shows the substantial improvement in the viscosity of the calcium carbonate suspension when the grinding agent is completely neutralized according to the invention (test 11), whereas the viscosities are high and unstable with time in the case where the grinding agent is neutralized according to the prior art.

Due to the grinding agent according to the invention, the suspension of calcium carbonate with a high concentration of dry matter, acquire after grinding a very low stable viscosity.

EXAMPLE 6

This example which is intended to illustrate the object of the invention, concerns the grinding of the same calcium carbonate used in example 1, in the presence of a grinding agent which is a completely neutralized polyacrylic acid, obtained by polymerization of the acrylic acid according to the same processes as those used for test 2 of example 1.

In a test no 12 which illustrates the invention, the calcium carbonate was ground in the presence of polyacrylic acid obtained by radical polymerization of the acrylic acid in water in the presence of isopropanol with complete neutralization of the polymerizate by two neutralizing agents, first using sodium hydroxide (rate of 0.7) and secondly magnesium hydroxide (rate of 0.3).

In a test no. 13 which illustrates the invention, the calcium carbonate was ground in the presence of polyacrylic acid obtained by radical polymerization of the acrylic acid in an aqueous medium in the presence of isopropanol with complete neutralization of the polymerizate, using two neutralizing agents, first sodium hydroxide (rate of 0.83 and secondly zinc hydroxide (rate of 0.17).

In a test no. 14 which illustrates the invention, the calcium carbonate was ground in the presence of polyacrylic acid obtained by radical polymerization of the acrylic acid in an aqueous medium in the presence of isopropanol with complete neutralization by two neutralizing agents, one being sodium hydroxide at a rate of 0.90, the other aluminum hydroxide at a rate of 0.10.

For each of the tests 12, 13 and 14, an aqueous suspension of calcium carbonate from the Orgon (France) deposit with a grain size less than 43 microns was prepared.

The aqueous suspension had a concentration of dry matter of 76% by weight with respect to the total mass.

The grinding agent was introduced into the suspension in the amounts shown in Table 6 below, expressed as a percentage by weight with respect to the mass of calcium carbonate to be ground.

The suspension to be ground was placed in the same grinder as in example 1, with the same amount of grinding agent and was treated according to the same experimental criteria in order that the results obtained may be compared with those of example 1.

All the experimental results are shown in Table 6 below.

TABLE 6

|  | TEST 12 | TEST 13 | TEST 14 |
|---|---|---|---|
| Mineral substance to be ground | CaCO$_3$ (urgonite) | CaCO$_3$ (urgonite) | CaCO$_3$ (urgonite) |
| Concentration of dry matter in the suspension being ground | 76% | 76% | 76% |
| Grinding agent | Polyacrylic acid | Polyacrylic acid | Polyacrylic acid |
| Polymerization medium | Water and isopropanol | Water and isopropanol | Water and isopropanol |
| Neutralization rate for agent with: | | | |
| a monovalent function | Na$^+$: 0.7 | Na$^+$: 0.83 | Na$^+$: 0.90 |
| a polyvalent function | Mg$^{++}$: 0.30 | Zn$^{++}$: 0.17 | Al$^{+++}$: 0.10 |
| Specific viscosity of the grinding agent | 0.54 | 0.54 | 0.54 |
| Consumption of grinding agent in percent dry weight | 1.06 | 1.16 | 1.08 |
| pH of grinding medium | 9.2 | 9.2 | 9.2 |
| Percentage mineral substances at 1 micron after grinding | 78 | 79 | 78 |
| Grinding temperature kept at: | 65° C. | 65° C. | 65° C. |
| Viscosity in cps at 20° C. | | | |
| on completion of grinding | 350 | 400 | 400 |
| after standing for 24 hrs, stirred before measurement | 420 | 460 | 520 |

This sixth table shows, by comparison with the table for example 1, the extraordinary fall in the viscosity of the calcium carbonate suspension resulting from a grinding operation according to the invention (excluding test 14 after standing for 8 days), by carrying out the complete neutralization of the polyacrylic acid using at least one neutralizing agent with a monovalent function and at least one neutralizing agent having a polyvalent function.

This sixth table also shows by comparison with tests 7, 9 and 11 that it is possible to replace $Ca^{++}$ as a neutralizing agent by $Mg^{++}$, $Zn^{++}$ or $Al^{+++}$, the neutralizing agent having a polyvalent function being bivalent or trivalent.

EXAMPLE 7

This example which is intended to illustrate the object of the invention concerns the grinding of the same calcium carbonate used in example 1, in the presence of a grinding agent which is a completely neutralized polyacrylic acid, obtained by polymerization of acrylic acid by means of the same processes as were used for test 2 of example 1.

In a test no. 15 which illustrates the invention, the calcium carbonate was ground in the presence of polyacrylic acids obtained by radical polymerization of acrylic acid in water in the presence of isopropanol and complete neutralization of the polymerizate by two neutralizing agents, one being sodium hydroxide at a rate of 0.7, the other being calcium hydroxide at a rate of 0.3.

In a test no. 16 which illustrates the invention, the calcium carbonate was ground in the presence of polyacrylic acid obtained by radical polymerization of the acrylic acid in an aqueous medium in the presence of isopropanol with complete neutralization of the polymerizate by two neutralizing agents, one being sodium hydroxide at a rate of 0.7, the other being magnesium hydroxide at a rate of 0.3.

In a test no. 17 which illustrates the invention, the calcium carbonate was ground in the presence of polyacrylic acid obtained by radical polymerization of acrylic acid in an aqueous medium in the presence of isopropanol with complete neutralization of the polymerizate by three neutralizing agents, the first being sodium hydroxide at a rate of 0.7, the second calcium hydroxide at a rate of 0.15 and the third magnesium hydroxide at a rate of 0.15.

For each of the tests 15, 16 and 17 an aqueous suspension of calcium carbonate obtained from the Orgon (France) deposit with a grain size less than 43 microns was prepared.

The aqueous suspension had a concentration of dry matter of 76% by weight with respect to the total mass.

The grinding agent was introduced into this suspension in the amounts shown in Table 7 below, expressed as a percentage by weight with respect to the mass of calcium carbonate to be ground.

The suspension to be ground was placed in the same grinder as in example 1, using the same amount of grinding agent and was treated according to the same experimental criteria in order that the results obtained may be compared with those of example 1.

All the experimental results are shown in Table 7 below.

TABLE 7

|  | TEST 15 | TEST 16 | TEST 17 |
|---|---|---|---|
| Mineral substance to be ground | CaCO$_3$ (urgonite) | CaCO$_3$ (urgonite) | CaCO$_3$ (urgonite) |
| Concentration of dry matter in the suspension being ground | 76% | 76% | 76% |
| Grinding agent | Polyacrylic acid | Polyacrylic acid | Polyacrylic acid |
| Polymerization medium | Water and isopropanol | Water and isopropanol | Water and isopropanol |
| Neutralization rate for agent with: |  |  |  |
| a monovalent function | Na$^+$: 0.7 | Na$^+$: 0.7 | Na$^+$: 0.7 |
| a polyvalent function | Ca$^{++}$: 0.3 | Mg$^{++}$: 0.3 | Ca$^{++}$: 0.15 Mg$^{+++}$: 0.15 |
| Specific viscosity of the grinding agent | 0.54 | 0.54 | 0.54 |
| Consumption of grinding agent in percent dry weight | 1.12 | 1.06 | 1.22 |
| pH of grinding medium | 9.2 | 9.2 | 9.2 |
| Percentage mineral substances at 1 micron after grinding | 79 | 78 | 79 |
| Grinding temperature kept at: | 65° C. | 65° C. | 65° C. |
| Viscosity in cps at 20° C. |  |  |  |
| on completion of grinding | 300 | 350 | 210 |
| after standing for 24 hrs, stirred before measurement | 310 | 420 | 190 |

This seventh table shows by comparison with Table 1 the suprising fall in the viscosity of the calcium carbonate suspension resulting from a grinding operation according to the invention.

Moreover, examination of the ratio (viscosity after standing for 8 days)/(viscosity immediately after grinding) is a significant indicator of the excellence of the invention, as the following values show:

| |
|---|
| Test 1 - Prior Art: 4.2 |
| Test 2 - Prior Art: 3.0 |
| Test 15 - Invention: 0.83 |
| Test 16 - Invention: 1.34 |
| Test 17 - Invention: 0.81 |

There is a fall in the aforementioned ratio of viscosities from values 3 to 4 in the case of former practice to close to and even less than 1 (tests 15 and 17).

Finally, a synergistic phenomenum appears between tests 15, 16 and 17 for although the pair of neutralising agents (Na+ and Ca++) have a more beneficial effect on the value and stability of the viscosities than the pair (Na+ and Mg++), the triple group consisting of these three neutralizing agents (Na+, Ca++ and Mg++) leads to a greater reduction in viscosities with time, an extremely favorable trend when large volumes of these suspensions are stored over long periods.

EXAMPLE 8

This example which is intended to illustrate the object of the invention concerns the grinding of the same calcium carbonate used in example 1 in the presence of a grinding agent which is a totally neutralized polyacrylic acid, obtained by polymerization of acrylic acid by means of the same processes as those used for test 2 of example 1, followed by an isopropanol extraction of the fraction of the acrylic polymer with specific viscosity lying between 0.3 and 0.8.

In a test no. 18 which illustrates the former practice, the calcium carbonate was ground in the presence of polyacrylic acid obtained by radical polymerization of acrylic acid in water with complete neutralization of the polymerizate by sodium hydroxide.

In a test no. 19 which illustrates the invention, the calcium carbonate was ground in the presence of polyacrylic acid obtained according to the process of test no. 2 of example 1, by radical polymerization of acrylic acid in an aqueous medium in the presence of isopropanol with complete neutralization of the polymerizate first using sodium hydroxide at a rate of 0.7 and secondly calcium hydroxide at a rate of 0.3.

The isopropanol extraction of the fraction of the acrylic polymer having a specific viscosity lying between 0.3 and 0.8 was done by separation into two phases, the less dense phase containing the major part of the polar solvent and the undesirable fraction of acrylic polymer were eliminated, while the denser aqueous phase was collected and constituted the fraction of acrylic polymer having the essential qualities of a grinding agent with a specific viscosity of 0.55.

For each of the tests 18 and 19, an aqueous suspension of calcium carbonate obtained from the Organ (France) deposit with a grain size of less than 43 microns was prepared.

The aqueous suspension had a concentration of dry matter of 76% by weight with respect to the total mass.

The grinding agent was introduced into this suspension in the amounts shown in Table 8 below, expressed as a percentage by weight with respect to the mass of calcium carbonate to be ground.

The suspension to be ground was placed in the same grinder as in example 1 with the same amount of grinding agent and was treated according to the same experimental critieria in order that the results obtained may be compared with those of example 1.

All the experimental results are given in Table 8 below.

TABLE 8

|  | TEST 18 | TEST 19 |
|---|---|---|
| Mineral substance to be ground | CaCO$_3$ (urgonite) | CaCO$_3$ (urgonite) |
| Concentration of dry matter in the suspension being ground | 76% | 76% |
| Grinding agent | Polyacrylic acid | Polyacrylic acid |
| Polymerization medium | Water and isopropanol | Water and isopropanol |

TABLE 8-continued

|  | TEST 18 | TEST 19 |
|---|---|---|
| Neutralization rate for agent with: |  |  |
| a monovalent function | Na+: 1.0 | Na+: 0.7 |
| a polyvalent function |  | Ca++: 0.3 |
| Specific viscosity of the grinding agent | 0.55 | 0.55 |
| Consumption of grinding agent in percent dry weight | 0.9 | 1.1 |
| pH of grinding medium | 9.2 | 9.2 |
| Percentage mineral substances at 1 micron after grinding | 78 | 79 |
| Grinding temperature kept at: | 65° C. | 65° C. |
| Viscosity in cps at 20° C. |  |  |
| on completion of grinding | 470 | 370 |
| after standing for 24 hrs, stirred before measurement | 500 | 310 |
| after standing for 8 days, stirred before measurement | 1140 | 350 |

The results in this table show the substantial fall in the viscosity of the calcium carbonate suspension resulting from the grinding operation according to the invention, i.e. carried out in the presence of a grinding agent consisting of the fraction of the polymer totally neutralized and isolated by means of a polar solvent.

EXAMPLE 9

This example which is intended to illustrate the object of the invention concerns the grinding of the same calcium carbonate used in example 1, in the presence of a grinding agent which is a completely neutralized polyacrylic acid, obtained by polymerization of acrylic acid according to the same processes used in test 2 of example 1.

In a test no. 20, the calcium carbonate was ground in the presence of polyacrylic acid obtained by radical polymerization of acrylic acid in water in the presence of isopropanol with complete neutralization of the polymerizate first by means of sodium hydroxide at a rate of 0.7 and secondly by methylcyclohexylamine at a rate of 0.3.

In a test no. 21, the calcium carbonate was ground in the presence of polyacrylic acid obtained by radical polymerization of acrylic acid in an aqueous medium in the presence of isopropanol with complete neutralization of the polymerizate first by sodium hydroxide at a rate of 0.7 and second by triethylamine at a rate of 0.3.

For each of the tests 20 and 21, an aqueous suspension of calcium carbonate from the Orgon (France) deposit with a grain size of less than 43 microns was prepared.

The aqueous suspension had a concentration of dry matter of 76% by weight with respect to the total mass.

The grinding agent was introduced into this suspension in the amounts shown in Table 9 below, expressed as a percentage by weight with respect to the mass of calcium carbonate to be ground.

The suspension to be ground was placed in the same grinder as in example 1, with the same amount of grinding agent and was treated according to the same experimental criteria, so that the results obtained may be compared with those in example 1.

All the experimental results are shown in Table 9 below.

TABLE 9

|  | TEST 20 | TEST 21 |
|---|---|---|
| Mineral substance to be ground | CaCO$_3$ (urgonite) | CaCO$_3$ (urgonite) |
| Concentration of dry matter in the suspension being ground | 76% | 76% |
| Grinding agent | Polyacrylic acid | Polyacrylic acid |
| Polymerization medium | Water and isopropanol | Water and isopropanol |
| Neutralization rate for agent with: | | |
| a monovalent function | Na$^+$: 0.7 | Na$^+$: 0.7 |
| a polyvalent function | M.C.H.: 0.3 | T.E.A.: 0.3 |
| Specific viscosity of the grinding agent | 0.54 | 0.54 |
| Consumption of grinding agent in percent dry weight | 1.05 | 0.89 |
| pH of grinding medium | 9.2 | 9.2 |
| Percentage mineral substances at 1 micron after grinding | 76 | 76 |
| Grinding temperature kept at: | 65° C. | 65° C. |
| Viscosity in cps at 20° C. | | |
| on completion of grinding | 250 | 300 |
| after standing for 24 hrs, stirred before measurement | 240 | 300 |

This ninth table shows by comparison with the table of example 1 the considerable fall in the viscosity of the calcium carbonate suspension resulting from a grinding operation according to the invention.

We claim:

1. A process for grinding of coarse mineral materials for use as pigments comprising the steps of introducing a grinding agent selected from the group consisting of acrylic acid homopolymers and copolymers which are predominantly acrylic acid and contain at least one monomer selected from the group consisting of methacrylic acid, itaconic acid, crotonic acid, fumaric acid, maleic acid, sinapic acid, aconitic acid, mesaconic acid, sinapinic acid, undecylenic acid, angelic acid, hydroxyacrylic acid, acrolein, acrylamide, acrylonitrile, esters of acrylic acid, esters of methacrylic acid, dimethylaminoethyl methacrylate, imidazoles, vinylpyrrolidone, vinylcaprolactam, ethylene, propylene, isobutylene, diisobutylene, vinyl acetate, styrene, alphamethylstyrene and methylvinylketone, which have been completely neutralized after polymerization by at least one neutralizing agent having a monovalent group selected from the group consisting of an alkali metal cation, an aliphatic and a cyclic amine and at least one neutralizing agent having a polyvalent group, into an aqueous suspension of such materials, and grinding the minerals in the presence of the acrylic polymer or copolymer.

2. A process as defined in claim 1 wherein the neutralizing agent having a polyvalent group is selected from the group consisting of divalent cations, trivalent cations and an aliphatic or cyclic amine.

3. A process as defined in claim 2 wherein the neutralizing agent having a divalent cation is selected from the group consisting of an alkaline earth cation and zinc.

4. A process as defined in claim 2 wherein the neutralizing agent having a trivalent cation is an aluminum compound.

5. A process as defined in claim 1 wherein the neutralization is carried out by means of two neutralizing agents, one neutralizing agent having a monovalent function and one neutralizing agent having a polyvalent group.

6. A process as defined in claim 1 wherein the neutralization rate of the neutralizing agent having a monovalent group is within the range of 0.40 to 0.95.

7. A process as defined in claim 1 wherein the neutralization rate of the neutralizing agent having polyvalent groups is within the range of 0.60 to 0.05.

8. A process as defined in claim 1 wherein the grinding agent is selected from the group consisting of polymers and copolymers of a monomer selected from the group consisting of acrylic, methacrylic, itaconic, crotonic, fumaric and maleic acids.

9. A process as defined in claim 1 wherein the aqueous suspension of the mineral contains at least 70% by weight of the mineral.

10. A process as defined in claim 1 wherein the grinding agent is introduced to the suspension in an amount within the range of 0.2 to 2% by weight of the grinding agent based on the weight of the mineral.

11. A process as defined in claim 1 wherein the grinding is carried out in the presence of a grinding material selected from the group consisting of silicon oxide, aluminum oxide, zirconium oxide, steels and hard synthetic resins.

12. A process as defined in claim 11 wherein the grinding material is present in a weight ratio of least 2:1 based on the weight of the mineral.

* * * * *